United States Patent [19]

Miyahara

[11] Patent Number: 4,496,594
[45] Date of Patent: Jan. 29, 1985

[54] METHOD OF HEATING AND PACKAGING FOOD

[75] Inventor: Kingo Miyahara, Tokyo, Japan

[73] Assignee: Dowa Company, Ltd., Tokyo, Japan

[21] Appl. No.: 541,477

[22] Filed: Oct. 14, 1983

Related U.S. Application Data

[63] Continuation of Ser. No. 367,635, Apr. 12, 1982, abandoned.

[30] Foreign Application Priority Data

Apr. 21, 1981 [JP] Japan ................................. 56-59975
Apr. 21, 1982 [JP] Japan ................................. 56-59976

[51] Int. Cl.³ ............................................. A23L 3/32
[52] U.S. Cl. ..................................... 426/234; 99/358; 99/451; 426/244; 426/414
[58] Field of Search ................ 426/234, 244–247, 426/107, 113, 410, 411, 413, 414; 99/358, 451; 219/385–387

[56] References Cited

U.S. PATENT DOCUMENTS

| 1,754,574 | 4/1930 | Sater | 99/358 |
|---|---|---|---|
| 1,961,681 | 6/1934 | Bohart | 426/234 |
| 2,013,675 | 9/1935 | Steerup | 426/107 |
| 2,182,383 | 12/1939 | Lang | 426/234 |
| 3,053,667 | 9/1962 | Luijerink | 426/246 |
| 3,062,663 | 11/1962 | Furgal et al. | 426/107 |
| 3,100,711 | 8/1963 | Eisler | 426/107 |
| 3,245,338 | 4/1966 | Korr | 426/107 |
| 3,311,285 | 3/1967 | Korr | 426/107 |
| 3,411,433 | 11/1968 | Christopher | 426/113 |
| 3,751,629 | 8/1973 | Eisler | 426/107 |
| 3,873,742 | 3/1975 | Miyahara | 426/234 |
| 3,997,677 | 12/1976 | Nirsch et al. | 426/113 |
| 4,027,132 | 5/1977 | Levinson | 426/243 |
| 4,054,672 | 10/1977 | Inou et al. | 426/246 |
| 4,089,982 | 5/1978 | Miyahara | 426/234 |
| 4,100,302 | 7/1978 | Theimer et al. | 426/234 |
| 4,109,566 | 8/1978 | Vigerstrom | 426/107 |
| 4,177,719 | 12/1979 | Balaguer | 99/358 |

FOREIGN PATENT DOCUMENTS

| 767768 | 10/1971 | Belgium | 426/234 |
|---|---|---|---|
| 55-48789 | 12/1980 | Japan . | |
| 767565 | 2/1957 | United Kingdom | 426/246 |

Primary Examiner—Steven Weinstein
Attorney, Agent, or Firm—Pollock, Vande Sande & Priddy

[57] ABSTRACT

A method of and an apparatus for producing a packed food, wherein a sheet of packing film of heat resisting and insulating material formed with a multiplicity of minuscule current passing apertures is placed on an insulating container open at the top and the bottom and having an electrode plate and a salt solution impregnated electrical contact member placed thereon which are positioned at the lower open end, and forced into the container in such a manner that the minuscule current passing apertures are in a horizontal plane in contact with the salt solution impregnated electrical contact member. Then a charge of unprocessed foodstuff is filled in the packing film, and an electrode plate is brought, through a salt solution impregnated electrical contact member, into contact with the minuscule current passing apertures and the unprocessed foodstuff positioned thereagainst. Thereafter a current is passed between the two electrodes so as to ripen and sterilize the unprocessed foodstuff into a processed food which is wrapped with the packing film.

1 Claim, 8 Drawing Figures

METHOD OF HEATING AND PACKAGING FOOD

This application is a continuation of Ser. No. 367,635, filed on Apr. 12, 1982, and now abandoned.

BACKGROUND OF THE INVENTION

This invention relates to a novel and improved method of producing a packed food and an apparatus for carrying out such method.

In recent years, there have been developed methods and apparatus for producing packed foods wherein a charge of a predetermined volume of unprocessed foodstuff is simply filled in a heat resistant packing film and positively ripened and sterilized by heat generated by an electric current passed therethrough, to readily provide precessed foods packed with the film to enable the foodstuff to be handled hygienically.

A proposal has been made by us to provide a method of producing a packed food which is disclosed in Japanese patent publication No. 48789/80. In this method, unprocessed foodstuff is placed in a packing bag formed at upper and lower surfaces with a multiplicity of minuscule current passing apertures and packed therein to provide a packed foodstuff. A pair of electrode plates are each placed against one of opposite surfaces of the packed foodstuff through a salt solution impregnated electrical contact member, and a current is passed between the two electrode plates while forming the packed foodstuff into a desired flat shape, to ripen and sterilize the foodstuff by the heat generated by electricity. Thus the packed foodstuff is processed into a processed packed food.

In the aforesaid method, the packing bag used for containing the unprocessed foodstuff is formed of heat resisting and insulating material which is soft and pliable and open at opposite ends. When a charge of foodstuff is filled in the bag, it is necessary that one open end of the bag be first tied up or otherwise closed and then the desired foodstuff be filled in the bag through the other open end, the other open end being sealed after the foodstuff is filled in the bag. This packing operation is troublesome and time-consuming. When a large number of packed foods are to be produced, it is impossible to carry out the operation efficiently in a short period of time. In addition, the packing bag is very thin and soft, and the open ends thereof become sticky when wet by the foodstuff charging operation, thereby making it difficult to readily open the ends. When such situation occurs, difficulty is experienced in filling the packing bag with a charge of unprocessed foodstuff in a predetermined volume, thereby making it difficult to perform foodstuff charging efficiently. In other words, the method has been found to be unsuitable for mass production of packed foods.

This invention has been developed for the purpose of obviating the aforesaid problem of the prior art. Accordingly, an object of the invention is to provide a method of producing a packed food using a packing film in the form of a sheet of film formed with a multiplicity of current passing apertures, wherein the packing film is forced into an insulating container open at opposite ends in such a manner that the minuscule current passing apertures are located in a horizontal plane, and a charge of unprocessed foodstuff is filled in a predetermined volume in the packing film thus forced into the insulating container. In this way, the foodstuff can be readily and quickly filled in a package to provide a packed processed food by merely passing a current uniformly through the foodstuff, no matter what the shape of the foodstuff may be.

Another object is to provide an apparatus for producing a packed food, in which unprocessed foodstuff is filled in a packing film formed with a multiplicity of minuscule current passing apertures and heated by passing a current therethrough to ripen and sterilize same, to thereby provide a packed processed food with a high degree of efficiency.

Still another object is to provide an apparatus for producing a packed food, in which an electrode plate having a salt solution impregnated electrical contact member placed thereon is located at an open bottom of an insulating container which is open at the top; unprocessed foodstuff is filled in the insulating container in such a manner that a sheet of packing film in a developed condition is interposed between the salt solution impregnated electrical contact member with minuscule current passing apertures of the packing film being positioned between the unprocessed foodstuff and the electrical contact member; and an electrode plate is brought into pressing contact with the top of the unprocessed foodstuff in the packing film through a salt solution impregnated electrical contact member. Then a current is passed uniformly between the two electrode plates, to produce in a short period of time a packed food ripened and sterilized by the heat generated by the current passed therethrough.

Additional and other objects, features and advantages of the invention will become apparent from the description set forth hereinafter when considered in conjunction with the accompanying drawings, in which:

DESCRIPTION OF THE PREFERRED EMBODIMENT

The construction of the apparatus suitable for carrying into practice the method according to the invention will be described by referring to a preferred embodiment shown in the accompanying drawings.

Figure 1:
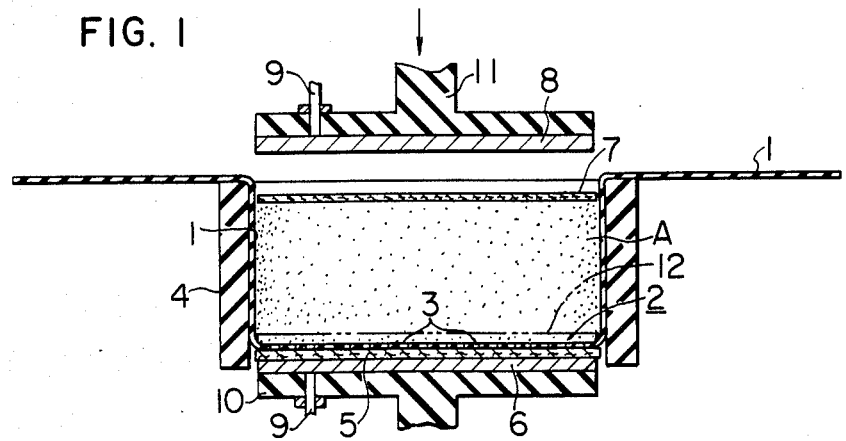
FIG. 1 is a vertical sectional view, with certain parts being cut out, of the apparatus comprising one embodiment of the invention suitable for carrying the method of producing a packed food according to the invention into practice.
Figure 2:
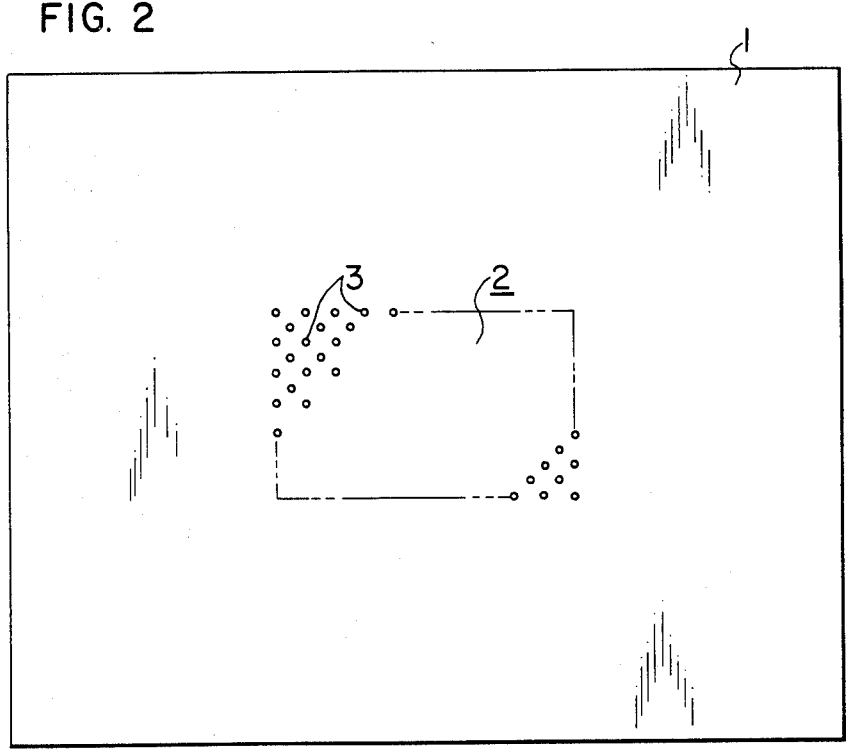
FIG. 2 is a plan view, with certain parts being cut out, of the packing film.
Figure 3:
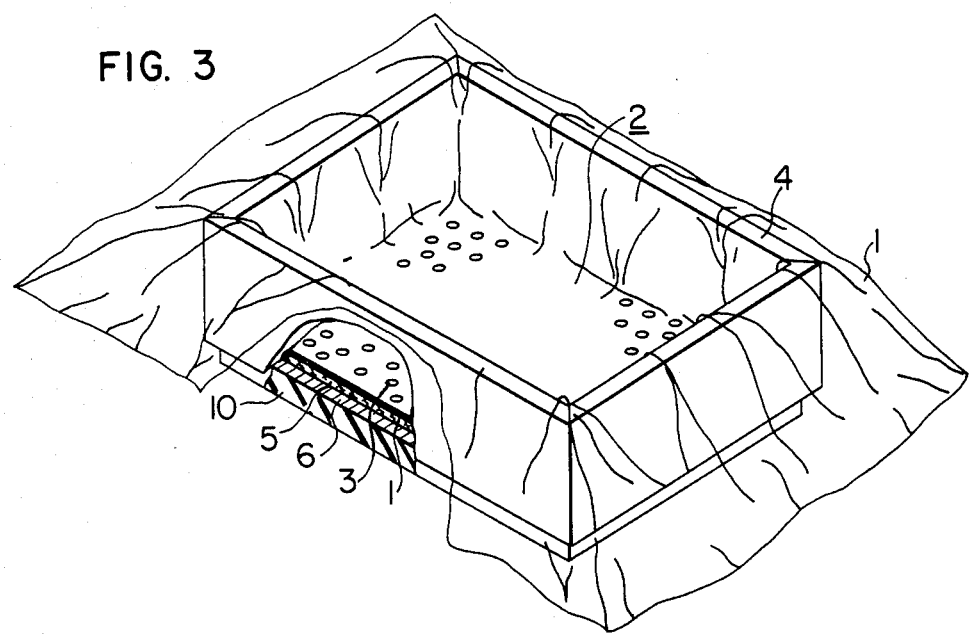
FIG. 3 is perspective view, with certain parts being broken away, of the insulating container having the packing film forced thereinto in a developed condition.
Figure 4:
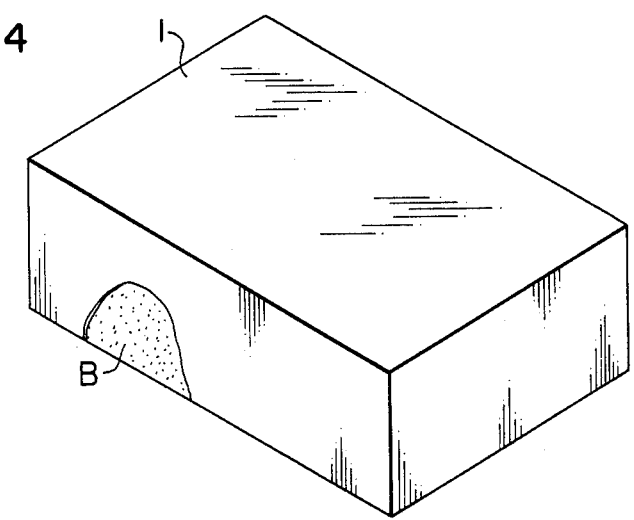
FIG. 4 is a perspective view, with certain parts being broken away, of the packed food.
Figure 5:
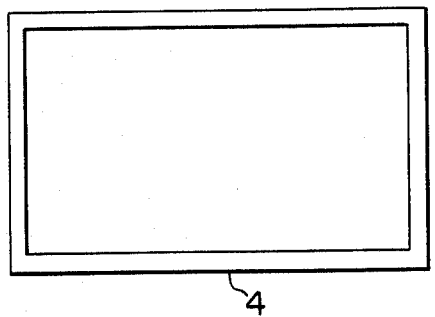
FIGS. 5–8 show modifications of the insulating container, FIG. 5 being a plan view of the insulating container of the rectangular form, FIG. 6 being a plan view of the insulating container of the elliptic form, FIG. 7 being a plan view of the insulating container of the square shape, and FIG. 8 being a plan view of the insulating container of the lozenge shape.
Figure 6:
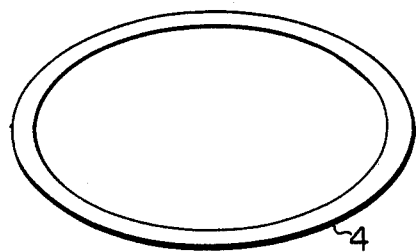
Figure 7:
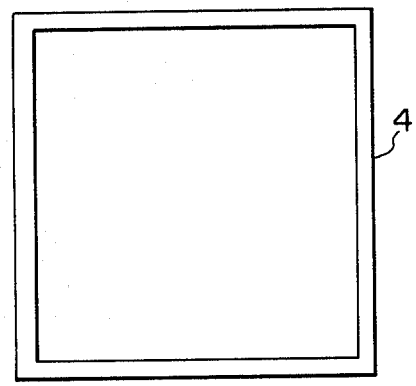
Figure 8:
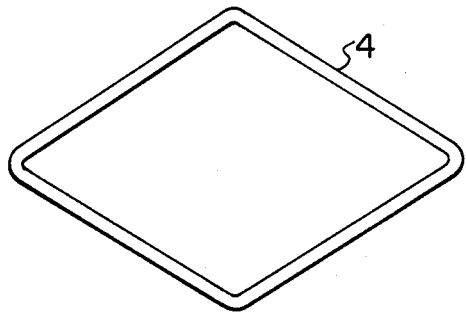

Referring to FIG. 1, a packing film 1 of a heat resisting and insulating material of small thickness is formed in one part or the whole of the sheet with a current passing apertures portion 2 having a multiplicity of minuscule current passing apertures 3 of a size small enough to keep the water content of foodstuff A wrapped with the packing film 1 from seeping to the outside. The foodstuff A may be unprocessed meat, fish, grains or vegetables or a whole marine product or a mixture thereof, either totally unprocessed or impregnated with a dilute salt solution and added with suitable seasonings and/or spices. The numeral 4 designates an insulating container open at the top and the bottom. Beside being cylindrical as shown in FIG. 1, the insulating container 4 may be of any shape as desired in cross section, such as rectangular (FIG. 5), elliptic (FIG. 6), square (FIG. 7) or lozenge shape (FIG. 8).

A salt solution impregnated electrical contact member 5 formed of moisture absorbing fiber material impregnated with a salt solution is placed on an electrode plate 6 which is positioned at the open bottom of the insulating container 4. A sheet of packing film 1 placed on the open top of the insulating container 4 is forced by any suitable means as desired into the insulating container in such a manner that the minuscule current passing apertures portion 2 are located on the salt solution impregnated electrical contact member 5. Then the unprocessed foodstuff A is filled in the packing film 1 forced into the insulating container 4, to be contained therein.

The numeral 7 designates a salt solution impregnated electrical contact member placed on the foodstuff A in the insulating container 4 through the packing film 1, to be brought into direct contact with the foodstuff A. The numeral 8 designates an electrode plate placed on the salt solution impregnated electrical contact member 7 in intimate contact therewith. The upper electrode plate 8 is constructed such that it applies a suitable load to the lower electrode plate 6. By passing a current between the upper and lower electrode plates 8 and 6, the current can be made to pass through the unprocessed foodstuff A through the pair of salt solution impregnated electrical contact members 7 and 5 and the current passing apertures 3, so that the unprocessed foodstuff A can be readily ripened and sterilized by the Joule heat generated by the current, to thereby provide processed food B.

The processed food B may be packed with the packing film 1 to provide a packed processed food or the processed food packed with the packing film 1 may be further wrapped with a packaging film to allow the processed food to be handled more hygienically. The numeral 9 designates a terminal connected to the electrode plates 6 and 8 for passing the current. The electrode plates 6 and 8 are attached to the inner surfaces of insulating members 10 and 11 respectively which each concurrently serve as a load applicator.

Operation of the apparatus of the aforesaid construction according to the invention will now be described. After the electrode plate 6 having the salt solution impregnated electrical contact plate 5 placed thereon is positioned at the lower open end of the insulating container 4 open at the top and the bottom, a sheet of packing film 1 formed with the current passing apertures portion 2 is placed on the open top of the insulating container 4 and forced into the insulating container 4 by suitable means in such a manner that the minuscule current passing apertures portion 2 are in a horizontal plane on the electrical contact member 5. Then the unprocessed foodstuff A is filled in the packing film 1 in a predetermined volume, and the salt solution impregnated electrical contact member 7 is placed on the charge of unprocessed foodstuff A. By bringing the electrode plate 8 into pressing contact with the electrical contact member 7 under a suitable pressure, the unprocessed foodstuff A can be brought into intimate contact with the pair of salt solution impregnated electrical contact members 5 and 7 and the pair of electrode plates 6 and 8.

By passing a current between the pair of electrode plates 6 and 8, the current can be passed uniformly and smoothly through the unprocessed foodstuff A through the pair of salt solution impregnated electrical contact members 5 and 7 and the current passing apertures 3. Thus the unprocessed foodstuff A can be quickly ripened and sterilized by the Joule heat generated by resistance, to enable the delicious processed food B to be obtained in a short period of time. After the processed food B is withdrawn from the insulating container 4 together with the packing film 1, the processed food B may be packed with the packing film 1 to provide a packed processed food or the packed processed food obtained may be further packed with a packaging film to enable the processed food B to be handled more hygienically.

During the process of ripening and sterilizing the foodstuff A by heat, the water content of the foodstuff A seeps through the minuscule current passing apertures 3 to the salt solution impregnated electrical contact member 5 outside the packing film 1 to render the plate 5 wetter. This is conductive to increased amount of current passed through the foodstuff A, to enable the foodstuff A to be positively processed in a short period of time. In addition, rupture of the packing film 1 is avoided no matter how much the foodstuff A expands. By arranging an additional salt solution impregnated electrical contact member 12 similar to the member 5 inside the packing film 1 and bringing the same into direct contact with the foodstuff A, it is possible to let the additional salt solution impregnated electrical contact member first absorb the water content of the foodstuff A seeping therethrough and then to make salt solution impregnated electrical contact member 5 absorb the seeped water content through the minuscule current passing apertures 3, thereby avoiding leaks of the water content from the insulating container 4.

From the foregoing description, it will be appreciated that according to the invention, the packing film 1 is forced into the insulating container 4 open at the top and the bottom and having the salt solution impregnated electrical contact member 5 on the electrode plate 6 positioned at the lower open end, with the minuscule current passing apertures 3 being in a horizontal plane in contact with the salt solution impregnated electrical contact member 5. A charge of unprocessed foodstuff A is filled in a predetermined volume in the packing film 1 into the insulating container 4, and the electrode plate 8 is pressed, through the salt solution impregnated electrical contact member 7, against the current passing apertures 3 and the foodstuff A positioned thereagainst. By passing a current to the electrode plates 8 and 6, ripening and sterilizing of the foodstuff A by heat can be achieved by the Joule heat, to provide the processed food B which can be packed with the packing film 1. Thus the invention enables the unprocessed foodstuff A to be positively and readily filled in the packing film 1 despite the latter being a single sheet, and allows the foodstuff A thus filled in the packing film 1 to be uniformly and quickly ripened and sterilized by a current passed therethrough to provide the processed food B. Thus the invention offers the advantage that the method and apparatus according to the invention can produce the processed foods B on a mass production basis because the method according to the invention enables packing of the foodstuff A to be carried out more efficiently and smoothly than the conventional method using bags by virtue of the foodstuff A being able to be inserted in the packing film 1 through an opening greater than the opening of the bag. The invention enables production cost to be reduced as compared with the method of the prior art because the packing film 1 is less expensive than the bag used in the method of the prior art. Moreover, it is possible to avoid production of unacceptable foods, even if the foodstuff A expands during the ripening and sterilizing process by the action of heat because the packing film 1 is in one piece and resists rupture. By altering the shape of the insulating container 4, it is possible to produce a processed food or packed food of any thickness and shape as desired. Since the packing film 1 is in one piece as described hereinabove, it is possible to readily accommodate any variation in the shape of the processed food B or an increase or decrease in the volume of the unprocessed foodstuff A, to readily provide a packed food of suitable size and shape.

What is claimed is:

1. A method of producing packaged food comprising:

placing a single planar flexible sheet of heat resisting and insulating packing film down into the interior of a cylindrical insulating container completely open at the top and bottom, a portion of said single sheet having a plurality of current passing apertures, which apertures are formed substantially in the center thereof, and wherein said sheet lines the interior surface of the container with the edges of the sheet extending over and beyond the container top, and the portion of said sheet having a plurality of current apertures lies against a first salt solution impregnated electrical contact member provided at the open bottom of said container supported by a first electrode plate;

filling said single heat resisting sheet lined container with unprocessed foodstuff;

placing a second salt solution impregnated electrical contact member abutting a second electrode in the top of said container in pressing contact directly against said foodstuff;

passing an electrical current between said two electrode plates and through said foodstuff, salt impregnated contact member and plurality of current passing apertures of the single sheet, so that said unprocessed foodstuff is ripened and sterilized;

removing said second electrode plate and salt solution impregnated electrical contact member from said foodstuff; and wrapping said processed foodstuff with the edges of said single heat resisting sheet.

* * * * *